Oct. 24, 1967 C. H. COKER 3,349,180
EXTRAPOLATION OF VOCODER CONTROL SIGNALS
Filed May 7, 1964 5 Sheets-Sheet 1

INVENTOR
C. H. COKER
BY Jules P. Kirsch
ATTORNEY

Oct. 24, 1967 C. H. COKER 3,349,180

EXTRAPOLATION OF VOCODER CONTROL SIGNALS

Filed May 7, 1964 5 Sheets-Sheet 2

Oct. 24, 1967 C. H. COKER 3,349,180

EXTRAPOLATION OF VOCODER CONTROL SIGNALS

Filed May 7, 1964

5 Sheets-Sheet 3

3,349,180

EXTRAPOLATION OF VOCODER CONTROL SIGNALS

Cecil H. Coker, Berkeley Heights, N.J., assignor to Bell Telephone Laboratories, Incorporated, New York, N.Y., a corporation of New York Filed May 7, 1964, Ser. No. 365,654
13 Claims. (Cl. 179—1)

This invention relates to speech communication systems, and in particular to speech communication systems in which human speech is encoded in terms of selected information bearing characteristics.

Conventional speech communication systems, for example, commercial telephone systems, typically convey human speech by transmitting an electrical facsimile of the acoustic wave form produced by a human talker. Because of the redundancy of human speech, however, facsimile transmission is a relatively inefficient way to transmit speech information, and it is well known that the information contained in a typical speech sound may be transmitted over a channel of substantially narrower bandwidth than that required for facsimile transmission of the speech wave form.

A number of arrangements for compressing or reducing the amount of bandwidth employed in the transmission of speech information have been proposed, one of the best known of these arrangements being the so-called "resonance vocoder." A specific version of the resonance vocoder is described in J. C. Steinberg Patent 2,635,146, issued April 14, 1953.

The distinctive feature of resonance vocoder systems is the transmission of speech information in terms of narrow bandwidth control signals representative of the frequency locations of selected peaks of maxima in the speech amplitude spectrum which correspond to the principal formants or resonances of the human vocal tract. A typical resonance vocoder system includes at a transmitter station an analyzer for deriving from an incoming speech wave a group of narrow bandwidth control signals including resonance control signals representative of the frequencies of selected formant or resonant peaks in the speech spectrum. After transmission to a receiver station, the control signals are applied to a synthesizer that is provided with controllable resonant circuits for shaping an artificial spectrum to have peaks at frequencies specified by the resonance control signals, thereby reconstructing a replica of the spectrum of the original speech wave.

A number of improvements have been made in the analyzer portion of resonance vocoder systems; for example, see the copending applications of C. H. Coker, Serial Nos. 322,389 and 322,390, both filed Nov. 8, 1963, now respectively Patents 3,327,058 and 3,327,057, both granted on June 20, 1967, so that it is now possible to determine the frequency locations of resonances with a relatively high degree of accuracy. However, the relatively high degree of accuracy obtained by resonance vocoder analyzers is not fully reflected in the narrow band control signals representing the frequency locations of the resonances, and it has been determined that the reason for this lies in the smoothing or averaging which is performed upon the analyzer output signals in order to obtain narrow band signals suitable for transmission over a narrow band channel.

The effect of this averaging may be most readily understood in terms of the characterization of speech in a succession of voiced and unvoiced sounds which vary in duration. A typical resonance vocoder analyzer tracks the frequencies of selected resonances to produce a number of output signals representing the frequency locations of particular resonances of either voiced sounds or unvoiced sounds, so that at the transition between a voiced sound and an unvoiced sound there is an abrupt change in each of the resonance signals between a rest value and a value representing the tracked frequency of a particular resonance. Hence, when a resonance signal is averaged over some predetermined time interval, the length of the time interval ordinarily being determined by the impulse response of a low-pass filter employed as an averaging device, the value represented by the resulting narrow band signal at the voiced-unvoiced sound boundary is erroneous, since the averaging interval embraces both true frequency values and an arbitrary rest value.

In the present invention, the error produced by averaging is avoided by providing at a resonance vocoder transmitter terminal an extrapolation arrangement that produces from selected resonance output signals of an analyzer extrapolated values derived from tracked frequency values so that the values which are averaged at voiced-unvoiced boundaries are related to the tracked value of the resonant frequency. The extrapolation arrangements include an extrapolation circuit for each of the analyzer output signals to be extrapolated, each extrapolation circuit being interposed between the analyzer and the corresponding averaging device. Within each extrapolation circuit, the analyzer output signal is delayed by a predetermined amount of time, and from both the initial signal values at the start of a voiced or an unvoiced interval and the final signal values at the termination of a voiced or an unvoiced interval, there is derived a selected number of extrapolated signals representing extrapolations of the initial and final signal values with respect to time. Some of the extrapolated signals precede the delayed analyzer output signal and some of the extrapolated signals follow the delayed analyzer output signal, so that the interval over which subsequent averaging of the delayed analyzer output signal and its associated extrapolated signals is performed includes extrapolated values instead of arbitrary rest values at the voiced-unvoiced boundaries. Hence, the resulting narrow band control signals accurately represent the values obtained by the analyzer at voiced-unvoiced boundaries as well as during voiced and unvoiced intervals.

The invention will be fully understood from the following detailed description of illustrative embodiments thereof, taken in connection with the appended drawings, in which.

Figure 1:
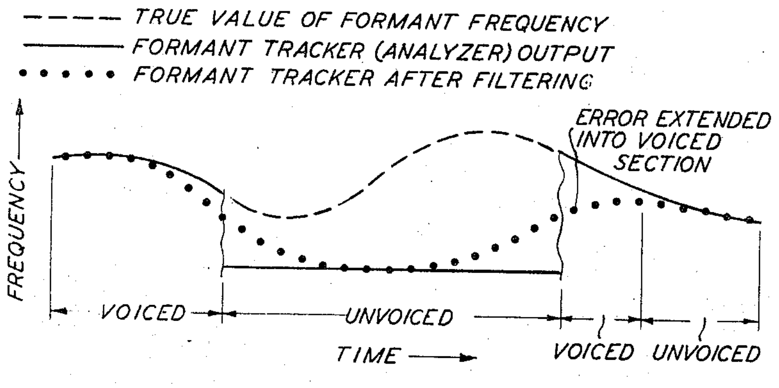
FIGS. 1 and 2 are graphs that are of assistance in explaining the features of this invention.

Referring first to FIG. 1, this drawing illustrates graphically the values represented by a typical narrow band formant frequency control signal during transitions between voiced and unvoiced sounds. It is observed that even though the formant tracker or analyzer detects the true values of the formant frequency during voiced sounds, the control signal after filtering, as shown by the dotted line, departs substantially from the true values of the formant frequency detected by the formant tracker, shown by the dashed line, both at the transitions between voiced and unvoiced sounds and during the entire unvoiced sound interval. The departure of the narrow band formant frequency control signal from the true formant frequency values arises from the averaging action of the low-pass filter which smooths the formant analyzer output signal over some preassigned time interval to produce a narrow band control signal. Thus at the transition from the end of a voiced sound to the beginning of an unvoiced sound, the last portion of the analyzed output signal is averaged over a time interval that includes a portion of the unvoiced interval, and since the formant tracker is ordinarily inoperative during unvoiced sounds, the last portion of the analyzer output signal is averaged with a zero value, thereby causing the resulting narrow band signal to indicate a formant frequency that departs substantially from the true formant frequency. Similarly, at the onset of the next voiced interval, the smoothing filter averages the first portion of the analyzer output signal over an interval that includes the last part of the preceding unvoiced interval. Since the analyzer output signal is at an arbitrary rest value during an unvoiced interval, the averaging action of the smoothing filter produces a narrow band control signal that indicates a smaller frequency than the true formant frequency. In Delattre, P., A. M. Liberman, and F. S. Cooper: Acoustic Loci and Transitional Cues for Consonants, volume 275, Acoustical Society of America, page 769 (1955), it is shown that the values of formant frequencies, their directions and rates of change near voicing boundaries are valuable cues to the listener for correct perception and identification of consonants. Thus it can be understood that the present invention preserves consonant identification information that would oherwise be destroyed by low-pass filtering of formant signals.

Figure 2:
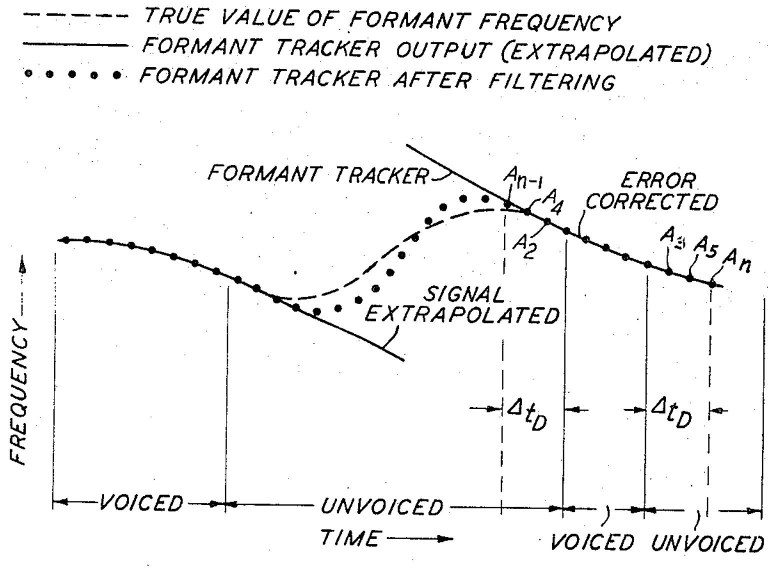

In contrast with FIG. 1, FIG. 2 illustrates graphically the improvement in formant frequency location achieved by the present invention. Specifically, in the present invention the output signal of a formant frequency analyzer, before low-pass filtering, is extended by extrapolation from a voiced interval forward into an unvoiced interval, and during the next succeeding voiced interval the analyzer output signal is extrapolated back into the preceding unvoiced interval. As a result of this extrapolation the filtered analyzer output signal, as illustrated by the dotted line in FIG. 2, accurately represents the formant frequency at the transitions between voiced and unvoiced sounds.

Figure 3:
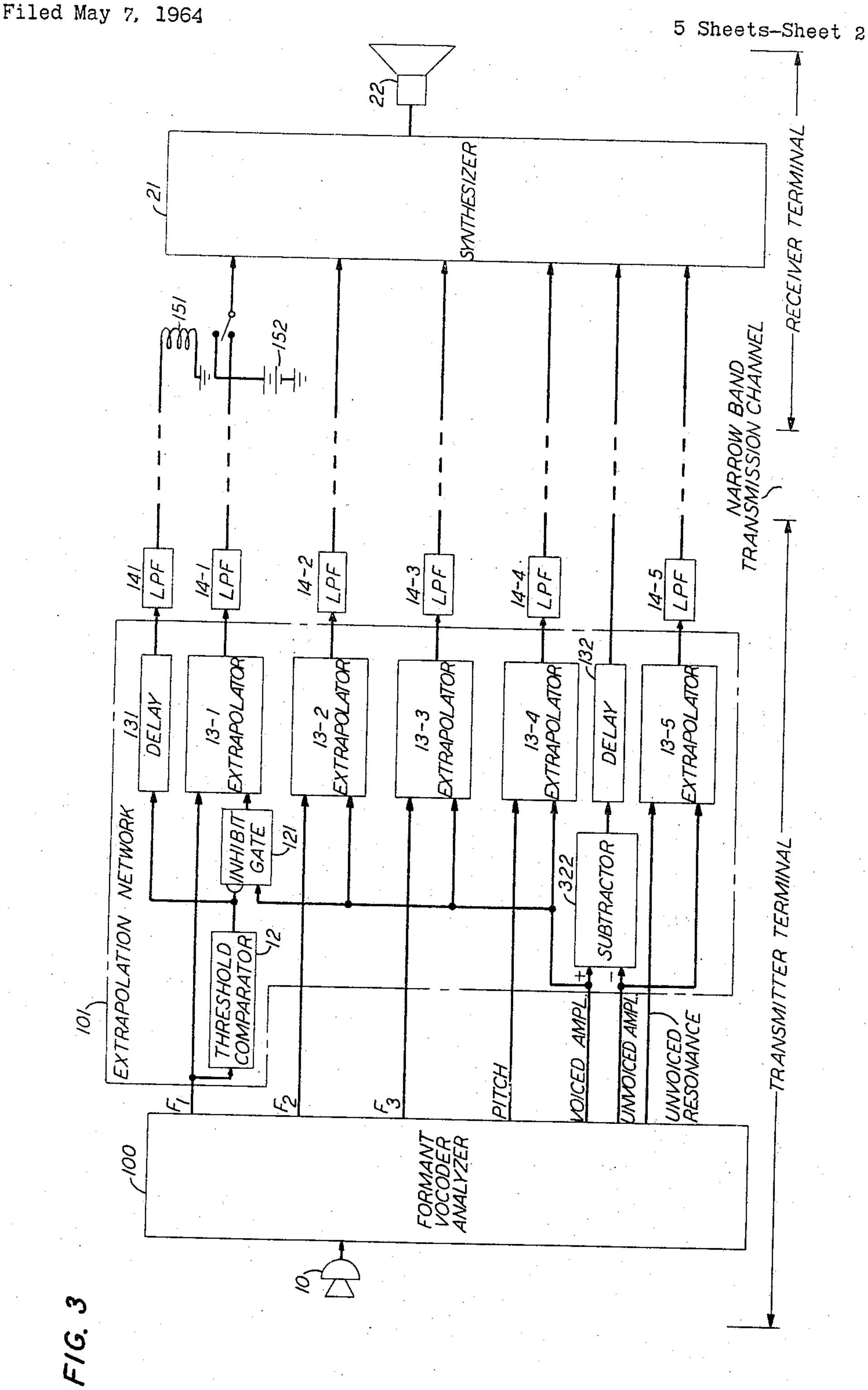
FIG. 3 is a block diagram showing a complete resonance vocoder system embodying the principles of this invention.

Turning now to FIG. 3, this drawing illustrates in block diagram form a complete formant vocoder system embodying the principles of the present invention. An incoming speech signal from source 10, which may be a conventional microphone of any variety, is applied to a formant vocoder analyzer 100. Analyzer 100 may comprise the elements 11, 109 and 110 shown at the transmitter station in FIG. 1 of the copending application of E. E. David, Jr., J. L. Flanagan, Serial No. 235,703, filed November 6, 1962, now Patent 3,190,963, granted June 22, 1965. However, for simplicity of presentation, analyzer 100 is shown here as an abridged version of the apparatus shown in the above-mentioned David et al. reference in that only three voiced nonnasal resonances and a single unvoiced resonance are utilized, together with a pitch signal, a voiced amplitude signal, and an unvoiced amplitude signal. The three voiced nonnasal resonance signals are denoted $F_1$, $F_2$, and $F_3$, and it is to be understood that none of the signals appearing at the output terminals of analyzer 100 have been smoothed or averaged by low-pass filtering. It is to be understood, of course, that the principles of this invention apply with equal force to the complete system shown in the David et al. reference.

Figure 5:
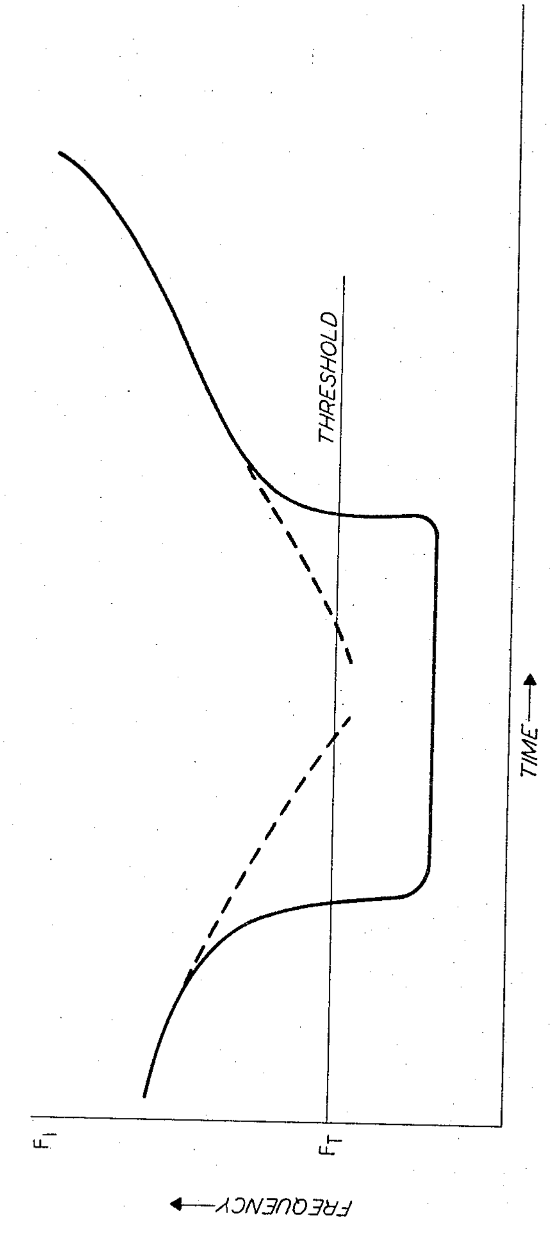
FIG. 5 is another graph that is of assistance in explaining the features of this invention.

The three non-nasal resonance signals $F_1$, $F_2$, and $F_3$ are extrapolated in extrapolators 13–1, 13–2, and 13-3, respectively, while the pitch and unvoiced resonance signals are respectively extrapolated in extrapolators 13–4 and 13–5. With respect to the first nonnasal resonance frequency represented by the $F_1$ signal, it has been observed that this resonance is subject to abrupt changes in its location on the frequency scale, as shown in FIG. 5, these changes not necessarily coinciding with transitions between voiced and unvoiced sounds. These abrupt drops in the first formant are important cues for the identification of nasal consonants and certain other consonants in which closure of the vocal tract occurs. Low-pass filtering at the $F_1$ signal during such changes produces erroneous indications of the first resonance location since the low-pass filter averages the high frequency values with the low frequency values. Hence, whereas for the other resonances $F_2$ and $F_3$ it is desired to extrapolate during unvoiced sounds only in order to obtain accurate indications of the resonance frequency locations at the voiced-unvoiced boundaries extrapolation is desired for the first resonance during both unvoiced intervals and during the occurence of abrupt changes in frequency location. The dashed lines in FIG. 5 illustrate that extrapolation during such abrupt changes maintains a correct frequency location for the first resonance at the transition points.

In order to obtain extrapolation of the resonance signal $F_1$ when abrupt changes in frequency occur, the $F_1$ signal is passed through a suitable threshold comparator 12, which develops an output signal, indicating that $F_1$ has fallen below a preset threshold frequency $F_T$. The output signal of comparator 12 is passed to the inhibitory control terminal of a conventional inhibit gate 121, while the voiced amplitude control signal is applied to the input terminal of gate 121. By this arrangement, no signal will appear at the output terminal of gate 121 whenever a threshold signal is applied from comparator 12 or whenever the voiced amplitude signal is absent. As explained in detail below, circuits 13–1 through 13–5 perform extrapolation only during the absence of a control signal; hence circuit 13–1 performs extrapolation both during unvoiced intervals and during abrupt transitions in frequency of the resonance represented by the $F_1$ signal. The output signal produced by circuit 13–1 is then smoothed by low-pass filter 14–1 to obtain a narrow band control signal representative of the frequency location of the first resonance.

The threshold signal from comparator 12 is also passed through a delay 131, where delay element 131 has a delay value which matches that of extrapolators 13–1 through 13–5, and the delayed threshold signal is smoothed by low-pass filter 141 to serve as a narrow band control signal which is transmitted to the receiver station together with the narrow band control signal from filter 14–1 and the other control signals described below. At the receiver station, the threshold comparator signal is applied to a relay 151 so that when the threshold signal is absent, thereby indicating that $F_1$ exceeds the predetermined threshold, the narrow band signal from filter 14–1 is applied to synthesizer 21, whereas when the threshold signal indicates that $F_1$ is below the preset threshold, the armature of relay 151 is connected to a fixed voltage from energy source 152 which is utilized in synthesizer 21 to produce a fixed low frequency formant which approximates the frequency position of the first resonance during abrupt transitions of the type illustrated in FIG. 5. Thus the important recognition cue of the first formant's dropping to a low value is reconstructed at the synthesizer in spite of the low pass filtering before transmission.

Turning back to the transmitter terminal in FIG. 3, only the voiced amplitude control signal is employed to control extrapolator circuits 13–2, 13–3, and 13–4 for the $F_2$, $F_3$, and pitch signals, respectively. Thus during unvoiced sounds, when the voiced amplitude signal is absent circuits 13–2, 13–3, and 13–4 operate in the fashion described in detail below to extrapolate the respective incoming $F_2$, $F_3$, and pitch signals so that after smoothing by filters 14–2, 14–3, and 14–4 the resulting narrow band control signals accurately represent the frequencies of the second and third resonances and the pitch frequency at the boundaries between voiced and unvoiced signals. After transmission to a receiver station, these control signals are employed in synthesizer 21 in the fashion shown in the previously-mentioned David et al. reference.

The unvoiced resonance signal is also extrapolated before smoothing, but the operation of extrapolating circuit 13–5 is controlled by the unvoiced amplitude signal. Hence the unvoiced resonance signal is extrapolated when the unvoiced amplitude signal is absent, that is, circuit 13–5 performs extrapolation during voiced intervals. The output signal of circuit 13–5 is smoothed by low-pass filter 14–5 and then transmitted to synthesizer 21 together with the other control signals. The signals from filters 14–1 through 14–5 and delay elements 141 and 132 constitute the reduced bandwidth representation of the original speech signal in this invention. The collective bandwidth of these control signals, which is substantially smaller than the original speech signal, for example, on the order of 120 cycles per second exclusive of guard spaces, may be transmitted over a transmisison medium of relatively narrow bandwidth which is indicated in FIG. 3 by broken lines. At the receiver terminal these control signals are employed in synthesizer 21 to construct a replica of the original speech signal, and this replica signal may be converted into audible sound by reproducer 22, for example, a conventional loudspeaker.

Since the voiced amplitude control signal and the unvoiced amplitude control signal do not occur simultaneously, the two signals may be transmitted over a signal channel with a selected polarity indicating which of the two signals is present at a given instant. In the convention adopted in this invention, the presence of the voiced amplitude control signal will be indicated by positive polarity and the presence of the unvoiced amplitude control signal will be indicated by negative polarity, as indicated in subtractor 122. Before transmission to the receiver station the output signal of subtractor 122 is synchronized with the other signals by passing it through a delay element 132 which introduces a delay matching the combined delay of extrapolators 13–1 through 13–5 and low-pass filters 14–1 through 14–5.

The unvoiced resonance signal is also passed through extrapolator 13–5, where extrapolator 13–5 is controlled by the unvoiced amplitude signal.

Figure 4:
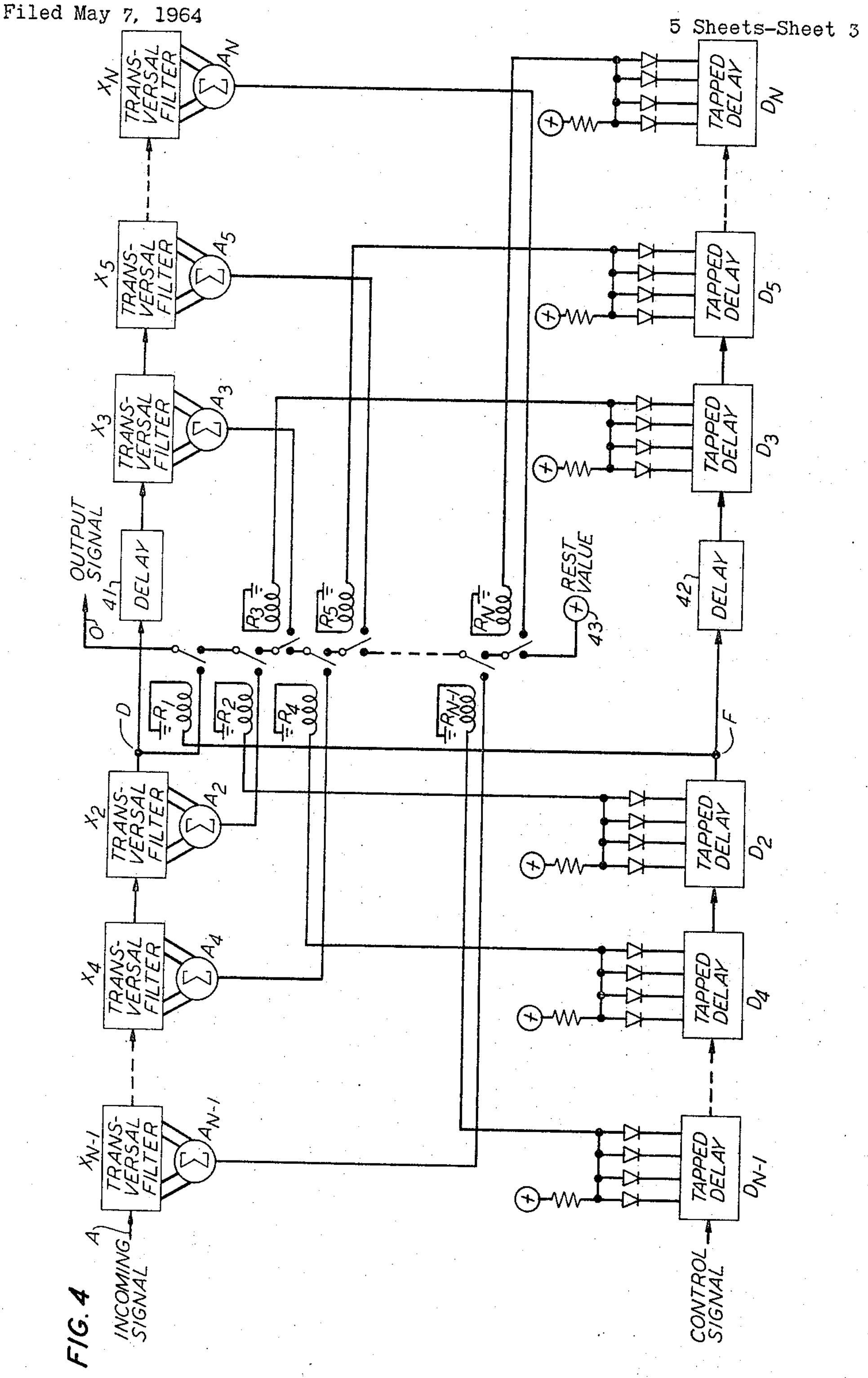
FIG. 4 is a circuit diagram showing in detail a specific embodiment of an extrapolation circuit employed in this invention.

Turning now to FIG. 4 this drawing illustrates a suitable extrapolation circuit, and since the operation and structure of extrapolators 13–1 through 13–5 are identical, only a single extrapolator is illustrated in detail. The incoming signal, for example, one of the voiced resonance, pitch or unvoiced resonance signals from analyzer 100, is applied to the input terminal of a first group of series-connected transversal filters $X_{N-1}$ through $X_2$. The output point D of transversal filter $X_2$ is connected through a delay element 41 to a second group of series-connected transversal filters $X_3$ through $X_N$, the number of filters in the first group being equal to the number of filters in the second group; hence the incoming signal appears after successive amounts of delay at the output terminals of successive transversal filters. Also, after weighting by predetermined amounts, the incoming signal at the lateral taps of each of the transversal filters, and the taps are connected to an adder, A, which develops at its output terminal a weighted sum of the sgnals appearing at the individual taps.

The control signal which controls the extrapolation performed by each circuit 13–1 through 13–5 is applied to a plurality of series-connected tap delay lines $D_{N-1}$ through $D_2$ to an output point F and thence through a delay element 42 to a second plurality of tapped delay lines $D_3$ through $D_N$, the tapped delay lines being in one-to-one correspondence with the similarly numbered transversal filters. Each delay line is provided with the same number of taps as the corresponding transversal filter; for example, each filter and each delay line is provided with four taps. Further, each delay line and each transversal filter represents equal amounts of delay.

The taps of each delay line are connected through individual diodes to a common output bus to which there is connected a source of positive potential through a load resistor. This arrangement serves to produce on the output bus a signal of positive polarity whenever the control signal appears simultaneously at all taps of the delay line; for example, when the voiced amplitude signal is utilized as a control signal, it produces a positive potential on the output bus of a delay line whenever the duration of a voiced interval is as long as the delay time of a delay line. The output bus of each delay line is connected to a corresponding relay in the network of normally deenergized interconnected relays $R_2$ through $R_N$, so that whenever a positive potential appears on an output bus the corresponding relay is energized. In addition, relay $R_1$ is energized by the appearance of a control signal at output point F of delay line $D_2$.

Relays $R_1$ through $R_N$ are interconnected to form a priority selection network which selects a particular signal for extrapolation according to the following logic. In the deenergized condition, the armature of relays $R_1$ through $R_{N-1}$ make contact with the armature at the next higher numbered relay, and the armature of relay $R_N$ makes contact with a source of positive potential, 43, which is set at a fixed rest value. In the energized condition, the armature of each relay $R_2$ through $R_N$ makes contact with the output terminal of adders $A_2$ through $A_N$, and the armature of relay $R_1$ makes contact with the output point D of transversal filter $X_2$. The sequential arrangement of relays $R_1$ through $R_N$ results in a certain priority in the output signal selected to appear at the output terminal O when two or more relays are energized at the same time. Thus the signal at point D has the highest priority, since the energizing of relay $R_1$ causes its armature to make contact with point D, thereby isolating all of the other relays whether they are energized or not. Similarly, the weighted signal at the output terminal of adder $A_2$ has the next highest priority since if relay $R_1$ is deenergized and relay $R_2$ is energized, then the armature of relay $R_2$ makes contact with the output terminal of adder $A_2$ and thereby isolates all of the other higher numbered relays. Hence the priority of signal selection effected by the network of relays causes the signal at point D to be given highest priority, followed by the signals at the output terminals of adders $A_2$ through $A_N$ in that order.

The operation of the circuit shown in FIG. 3 in extrapolating at the boundaries between voiced and unvoiced sounds will be most easily comprehended by the following hypothetical sequence of events. By way of example, it will first be assumed that an unvoiced sound is terminating and a voiced sound is beginning, and that the control signal is the voiced amplitude signal and the incoming signal is one of the nonnasal resonance signals, say $F_2$. As explained previously and as shown in the right hand portion of FIG. 2, it is necessary in this situation to extrapolate the incoming signal backward into the unvoiced interval for a length of time on the order of the delay time of the impulse response of the following low-pass filter. This extrapolation backward is achieved as follows.

It is first noted that the leading edge of the incoming second resonance signal $F_Z$, representing the initial frequency of the second resonance in the oncoming voiced sound, does not appear at output point O until it has first passed through filters $X_{N-1}, \ldots, X_4$, and $X_2$ to point D, at which time the voiced amplitude control signal has reached point F and energized relay $R_1$. Therefore the appearance of the initial frequency value of the second resonance of the oncoming voiced sound at point O is delayed by an amount of time equal to the sum of the delay times of the filters $X_{N-1}, \ldots, X_4$, and $X_2$, and it is this sum of filter delay times, denoted $\Delta t_D$, which constitutes the fixed delay introduced by circuits 13–1 through 13–5 and compensated for by delay element 131 in FIG. 3. However, prior to the apperance of this initial value at point O, the apparatus in FIG. 4 has been producing at point O a succession of extrapolated values of the initial value, as indicated in FIG. 2 by the dots labeled $A_{N-1}$, $A_4$, $A_2$. This is achieved by the passage of the control signal through successive delay lines $D_{N-1}$, . . . , $D_4$, $D_2$, which successively energizes the corresponding relays $R_{N-1}$, . . . , $R_4$, $R_2$, thereby successively connecting the output terminals of adders $A_{N-1}$, . . . , $A_2$ to point O. It will be recalled that the relays are arranged to connect the adder output terminals to point O on a priority basis, so that when the control signal has caused relays $R_{N-1}$, . . . , $R_4$, and $R_2$ to be energized, only the output terminal of adder $A_2$ is connected to point O.

In order for the succession of signals appearing at point O prior to the initial value to represent extrapolated values of the initial value, each transversal filter is constructed to produce at the output terminal of its adder a different weighted value of the samples of the incoming signal appearing at its taps according to the amount of delay time from the particular filter to point D. Suitable extrapolation formulas may be found in F. B. Hildebrand, Introduction to Numerical Analysis, page 36 (1956).

Following the arrival of the control signal at point F, it is evident that the unweighted incoming signal at point D is given priority over all of the weighted output signals of the adders as long as the voiced interval continues and the control signal appears at point F. When the voiced interval terminates and the next unvoiced interval begins, the voiced amplitude signal becomes absent, hence at a time $\Delta t_D$ after the end of the voiced sound, the voiced amplitude control signal disappears from point F, thereby de-energizing relay $R_1$ so that the next highest priority relay makes the connection to point O; that is, when relay $R_1$ is deenergized, relay $R_3$ remains energized because the control signal has not yet passed through it, hence the weighted output signal of adder $A_3$ is passed to output point O.

It is noted at this point that the weighted output signal at the output terminal of adder $A_3$ is a weighted sum of samples of the last portion of the incoming $F_2$ resonance signal, according to the amount of delay between point D and the filter $X_3$. Similarly, the weighted output signals of filters $X_5$, . . . , $X_N$ are also weighted sums of samples of the last portion of the incoming $F_2$ resonace signal, with different weights being assigned according to the different delay times between filters $X^4$, . . . , $X_N$ and point D. The dots labeled $A_3$, $A_5$, $A_N$ in FIG. 2 illustrate extrapolated values of the incoming signal at the boundary between termination of a voiced interval and onset of a succeeding unvoiced interval.

In the event that the duration of an unvoiced interval exceeds the combined delay times of transversal filters $A_{N-1}$, . . . , $A_4$, $A_2$, delay element 41, and transversal filters $A_3$, $A_5$, . . . , $A_N$, then all of the relays become deenergized. In that event, the signal appearing at output point O is the predetermined rest value of potential source 43, which may be some nonzero value selected to prevent excessive variations in the signal appearing at point O.

The operation of circuits 13–1, 13–3, 13–4, and 13–5 closely follows the operation of circuit 13–2 described above, the variations in operation due to the use of different control signals in the case of circuits 13–1 and 13–5 being readily apparent.

Figure 6:
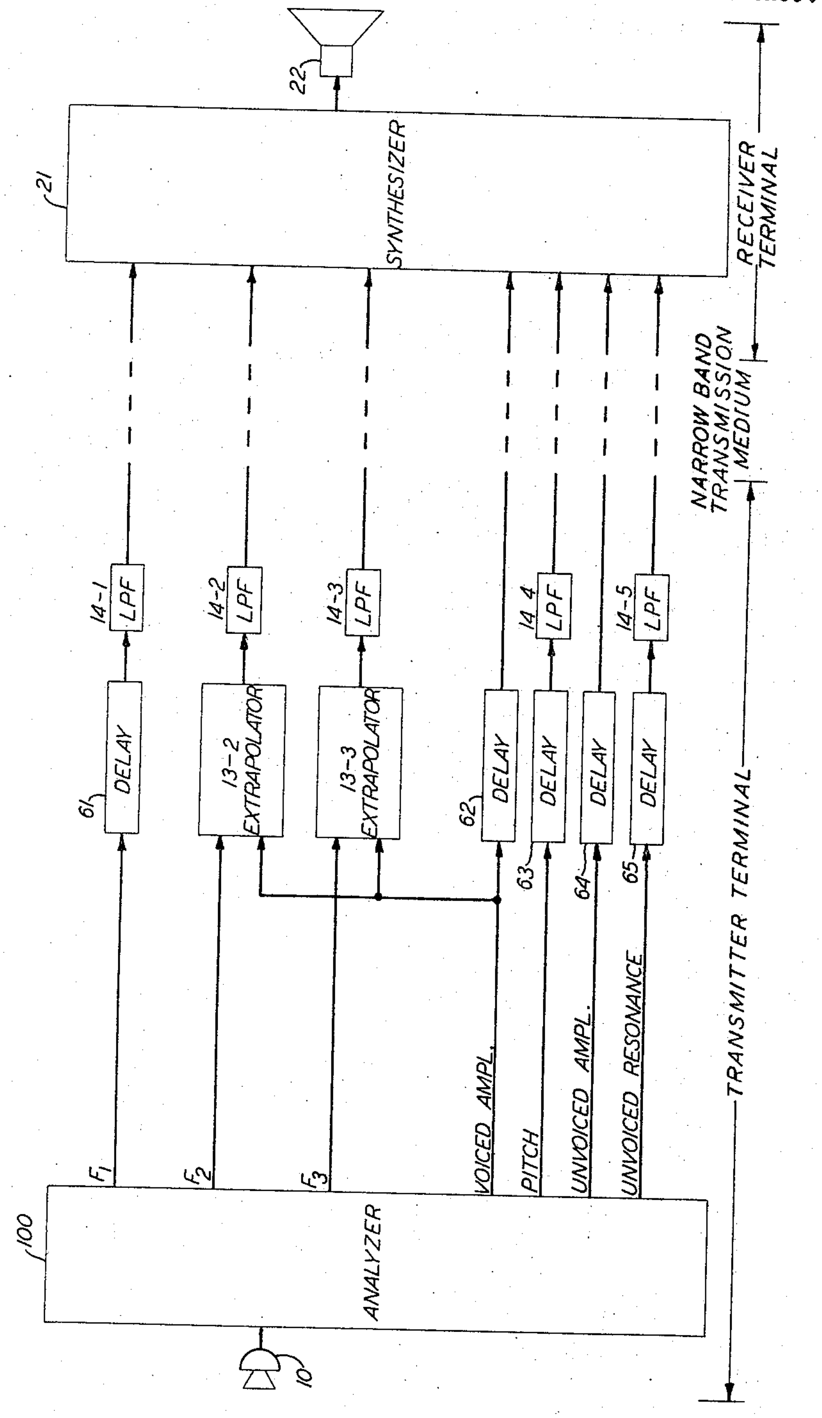
FIG. 6 is a block diagram showing an alternative resonance vocoder system embodying the principles of this invention.

Another embodiment of the principles of this invention is shown in FIG. 6, in which it is observed that extrapolation is applied to only two of the analyzer output signals, $F_2$ and $F_3$, the extrapolation being controlled by the voiced amplitude signal. It is to be understood that other arrangements for extrapolating one or more selected analyzer output signals may be constructed as desired.

Although this invention has been described in terms of a resonance vocoder system of the type shown in FIG. 3, it is to be understood that applications of the principles of this invention are not limited to this particular system, but include other resonance vocoder systems as well as various kinds of speech processing equipment in which accurate formant locations are required. In addition, it is to be understood that the above-described embodiments are merely illustrative of the numerous arrangements that may be devised for the principles of this invention by those skilled in the art without departing from the spirit and scope of the invention.

What is claimed is:

1. A resonance vocoder transmitter terminal which comprises
   a source of an incoming speech signal characterized by voiced portions and unvoiced portions,
   an analyzer for deriving from said speech signal a plurality of information signals representative of selected characteristics of said speech signal,
   a plurality of extrapolators for deriving from selected ones of said information signals extrapolated values of said selected signals at the transitions between said voiced and unvoiced portions of said speech signals,
   delaying means for synchronizing and remaining information signals from which extrapolated values are not derived with said selected information signals from which extrapolated values are derived.
   and a plurality of smoothing means for averaging both said selected plurality of information signals and their corresponding extrapolated values and said remaining synchronized information signals to obtain a plurality of narrow band control signals representative of said selected characteristics of said speech signal.

2. A bandwidth compression system that comprises
   a transmitter terminal including
   a source of an incoming speech signal characterized by voiced portions and unvoiced portions,
   an analyzer for deriving a plurality of information signals representative of selected characteristics of said speech wave, said information signals including a plurality of voice resonance signals indicative of the frequency locations of a corresponding plurality of selected resonances of said voiced portions, a voiced amplitude signal indicative of the energy content of said voiced portions, a pitch signal indicative of the frequency of the fundamental component of said voiced portions, and wherein each of said extrapolators develops said predetermined number of extrapolated signals by weighting by preassigned amounts both the initial values of said corresponding selected information signal at the beginning of each of said voiced portions and the final values of said corresponding selected information signal at the end of each of said voiced portions,
   a plurality of delay means for delaying by said predetermined uniform time interval said voiced amplitude signal, said unvoiced amplitude signal, and each of said voiced resonance, pitch, and unvoiced resonance signals not applied to said extrapolators,
   and a plurality of averaging means following said extrapolators and those of said delay means to which are applied voice resonance signals, said pitch signal, and said unvoiced resonance signals in order to develop a group of narrow band control signals,
   a narrow band transmission medium for delivering said group of narrow band control signals, said delayed voiced amplitude signal, and delayed unvoiced amplitude signal to a receiver terminal, and at said receiver terminal,
   means for synthesizing a replica of said incoming speech signal from said transmitted signals,
   and means for reproducing audible sound from said replica.

3. A bandwidth compression system which comprises a transmitter terminal including a source of an incoming speech wave characterized by a succession of voiced portions and unvoiced portions of varying durations and by resonances at various frequencies, an analyzer supplied with said speech wave for deriving a plurality of information signals representative of selected characteristics of said speech wave, said information signals including first, second, and third voiced resonance signals, a pitch signal, a voiced amplitude signal, an unvoiced amplitude signal, and an unvoiced resonance signal, an extrapolation network for deriving from each of a selected subgroup of said information signals a predetermined number of extrapolated signals representing extrapolations of selected values of said selected information signals, said extrapolation network comprising a threshold comparator supplied with said first voiced resonance signal for developing a threshold signal indicative of the periods during which the value of said first voiced resonance signal falls below a preassigned threshold, an inhibit gate supplied with said voiced amplitude signal and controlled by said threshold signal so that said voiced amplitude signal is not passed to the output terminal of said gate during periods in which the value of said first voiced resonance signal falls below said preassigned threshold, a first extrapolation circuit provided with an input terminal supplied with said first voiced resonance signal, a control terminal connected to the output terminal of said inhibit gate, and an output terminal at which there appears a delayed version of said first resonance signal both preceded and followed in time by a predetermined number of extrapolated signals representative of a corresponding number of predetermined extrapolated values of said first resonance signal at both transitions between voiced and unvoiced portions of said speech wave and transitions between periods during which said first voiced resonance signal exceeds and falls below said threshold, second, third, and fourth extrapolation circuits, wherein each of said second, third, and fourth extrapolation circuits is provided with: an input terminal respectively supplied with said second voiced resonance signal, said third voiced resonance signal, and said pitch signal; a control terminal supplied in parallel with said voiced amplitude signal; and an output terminal at which there appears a delayed version of each signal supplied to the respective input terminal, said respective delayed version being preceded and followed in time by a predetermined number of extrapolated signals representative of a corresponding number of predetermined extrapolated values of said signal applied to said respective input terminal at transitions between voiced and unvoiced portions of said speech wave, a fifth extrapolation circuit provided with an input terminal supplied with said unvoiced resonance signal, a control terminal supplied with said unvoiced amplitude signal, and an output terminal at which there appears a delayed version of said unvoiced resonance signal both preceded and followed in time by a predetermined number of extrapolated signals representative of a corresponding number of predetermined extrapolated values of said unvoiced resonance signal at transitions between voiced and unvoiced portions of said speech wave, first delaying means followed by a low-pass filter for developing from said threshold signal a narrow band threshold signal, and subtracting means followed by a second delaying means for developing said voiced amplitude signal and said unvoiced amplitude signal a single voiced-unvoiced information signal in which positive polarity portions correspond to said voiced amplitude signal and negative polarity portions correspond to said unvoiced amplitude signal, and a plurality of averaging devices in one-to-one correspondence with said extrapolation circuits in said extrapolation network for averaging the signals appearing at said output terminals of said extrapolation circuits over a preassigned averaging interval to obtain a corresponding plurality of narrow band information signals, a narrow band transmission medium for delivering said narrow band threshold signal, said voiced-unvoiced information signal, and said plurality of narrow band information signals to a receiver terminal, and at said receiver terminal, a potential source for supplying a potential having a predetermined value, switching means responsive to said narrow band threshold signal and provided with a first input point supplied with said narrow band information signal derived from said first extrapolation circuit, a second input point connected to said potential source, and an output point, wherein said first input point is connected to said output point when said narrow band threshold signal is absent and said second input point is connected to said output point when said narrow band threshold signal is present, synthesizer means connected to said output point of said switching means and supplied with said transmitted voiced-unvoiced information signal and said plurality of narrow band information signals other than said narrow band information signal derived from said first extrapolation circuit for synthesizing a replica of said incoming speech wave, and reproducer means for converting said replica into audible sound.

4. Extrapolation apparatus provided with an input point, an output point and a control point for deriving from an incoming information signal characterized by initial values and terminal values, a first plurality of extrapolated signals representing selected extrapolation values of said initial values of said information signal and a second plurality of extrapolated signals representing selected extrapolated values of said terminal values of said information signal which comprises a plurality of weighting means comprising a first subgroup of series connected weighting means connected from said input point through a first midpoint to a second subgroup of series-connected weighting means, wherein each of said weighting means is provided with an input terminal for receivng an incoming signal, an output terminal at which there appears a delayed version of said incoming signal, and a weighting terminal at which there is developed an extrapolated signal representing a weighted sum of selected values of said incoming signal, a plurality of tapped delaying means in one-to-one correspondence with said plurality of weighting means and comprising a corresponding first subgroup of series-connected delaying means connected from said control point through a second midpoint to a corresponding second subgroup of series-connected delaying means, wherein each of said delaying means is provided with an input terminal for receiving an incoming signal, an output terminal at which there appears a delayed version of said incoming signal, and a control terminal connected to a plurality of taps of said delaying means at which there is developed a control signal indicating the simultaneous presence of said incoming signal on all of said taps, and a priority selection network associable with said first and second mid-points, said weighting terminals of said plurality of weighting means, and said control terminals of said plurality of delaying means for selectively transferring each of said extrapolated signals in a prescribed order to said output point.

5. Apparatus as defined in claim 4 wherein said priority selection network comprises a plurality of individual switching devices, selected ones of which are connectable to individual corresponding ones of said delaying means and being energized to transfer an extrapolated signal from said corresponding weighting terminal to said output point.

6. Apparatus as defined in claim 5 wherein said priority selection network comprises another selected one of said switching devices which is connectable to said first and second midpoints and which is energized to transfer a delayed version of said incoming signal from an output terminal of a prescribed one of said plurality of weighting means to said output point.

7. Apparatus as defined in claim 6 wherein said delayed version of said incoming signal is transferred from said first mid-point to said output point.

8. Apparatus as defined in claim 6 wherein each of said switching devices comprises an electromechanical switching element having a two-terminal energizing winding, one of said winding terminals being connectable to a first source of potential and the other one of said winding terminals being connected to said corresponding delaying means control terminal; and a transfer contact means responsive to the energization of said element winding for controlling the connection of said corresponding weighting terminal to said output point.

9. Apparatus as defined in claim 8 wherein said transfer contact means of each of said switching element is arranged in combinational contact configurations for transferring to said output point that one of said weighting terminals having the highest priroity at any time.

10. Apparatus as defined in claim 9 wherein said combinational contact configurations comprise a pair of contacts on each of said switching elements, an armature of each of said switching elements except one being connected to one of said pair of contacts of the next lower priority one of said switching elements, and said selected one switching element having an armature connected to said output point.

11. Apparatus as defined in claim 10 wherein the other contact of each of said switching elements is connected to a weighting terminal corresponding to said switching device.

12. Apparatus as defined in claim 11 wherein each of said switching elements has an ordered rank of priority, said armature of each of said elements except the lowest priority one of said switching elements being connected to one of said pairs of contacts of the immediately higher priority one of said switching elements.

13. Apparatus as defined in claim 12 further comprising a fixed potential source, and wherein the other contact of said lowest priority one of said switching elements is connected to said last mentioned source.

References Cited

UNITED STATES PATENTS 3,268,661 8/1966 Coulter ---------------- 179—1

KATHLEEN H. CLAFFY, *Primary Examiner.*

R. MURRAY, *Assistant Examiner.*